United States Patent
Dandrea

(10) Patent No.: US 6,871,263 B2
(45) Date of Patent: Mar. 22, 2005

(54) METHOD AND APPARATUS FOR STRIPING DATA ONTO A PLURALITY OF DISK DRIVES

(75) Inventor: Robert G. Dandrea, Newtown, PA (US)

(73) Assignee: Sedna Patent Services, LLC, Philadelphia, PA (US)

( * ) Notice: Subject to any disclaimer, the term of this patent is extended or adjusted under 35 U.S.C. 154(b) by 577 days.

(21) Appl. No.: 09/940,728

(22) Filed: Aug. 28, 2001

(65) Prior Publication Data

US 2003/0046497 A1 Mar. 6, 2003

(51) Int. Cl.$^7$ ............................................. G06F 12/16
(52) U.S. Cl. ........................................ 711/114; 714/6
(58) Field of Search ............................. 711/114; 714/6

(56) References Cited

U.S. PATENT DOCUMENTS

| | | | | |
|---|---|---|---|---|
| 4,761,785 | A | 8/1988 | Clark et al. ................... | 371/51 |
| 5,581,778 | A | 12/1996 | Chin et al. .................. | 395/800 |
| 5,671,377 | A | 9/1997 | Bleidt et al. ................ | 395/328 |
| 5,954,822 | A | 9/1999 | Yashiro et al. ................ | 714/6 |
| 6,158,017 | A * | 12/2000 | Han et al. ...................... | 714/6 |
| 6,253,375 | B1 | 6/2001 | Gordon et al. ............... | 725/88 |
| 6,353,895 | B1 * | 3/2002 | Stephenson .................... | 714/5 |
| 2002/0007469 | A1 | 1/2002 | Taketa et al. .................. | 714/6 |
| 2002/0073279 | A1 * | 6/2002 | Sasamoto et al. ........... | 711/114 |
| 2002/0157113 | A1 * | 10/2002 | Allegrezza .................. | 725/115 |
| 2002/0161972 | A1 * | 10/2002 | Talagala et al. ............ | 711/114 |

OTHER PUBLICATIONS

U.S. Appl. No. 09/268,512, filed Mar. 12, 1999, Statistical Disk Scheduling for Video Servers.
U.S. Appl. No. 09/801,021, filed Mar. 7, 2001, Statistical Disk Scheduling for Video Servers.

* cited by examiner

*Primary Examiner*—Matthew Kim
*Assistant Examiner*—Woo H. Choi
(74) *Attorney, Agent, or Firm*—Moser, Patterson & Sheridan, LLP

(57) ABSTRACT

A method and apparatus for recovering data from a failed disk drive in a disk drive array. The method and apparatus includes storing data on an array of disk drives by dividing extents of data into data segments and defining a parity group including at least one data segment from a plurality of data segments from different extents. Parity segments are generated from the data segments in the parity group and stored in the parity group. Furthermore, a second parity segment is generated from the parity segments and storied with the parity group. The method and apparatus then outputs data in realtime to users in a normal disk access mode from parity groups without the failed disk drive, and outputs recovered data in realtime to the users in a parity correction mode from the parity group containing the failed disk drive.

38 Claims, 7 Drawing Sheets

FIG. 2 (PRIOR ART)

| | D0 | D1 | D2 | D3 | D4 | D5 | D6 | D7 | D8 | D9 | D10 | D11 |
|---|---|---|---|---|---|---|---|---|---|---|---|---|
| | A9 | A10 | A11 | A0 | A1 | A2 | A3 | PAR A0-A3 | A5 | A6 | A7 | PAR A4-A7 |
| | PAR B0-B3 | B5 | B6 | PAR A8-A11 | A13 | A14 | A15 | A4 | B0 | B1 | B2 | A8 |
| | B4 | | | A12 | PAR B4-B7 | B9 | B10 | PAR A12-A15 | PAR B8-B11 | B13 | B14 | B3 |
| | PAR B12-B15 | | | B7 | B8 | | | B11 | B12 | | | B15 |

FIG. 4

| | EXTENT 0 | EXTENT 1 | EXTENT 2 | EXTENT 3 | PARITY |
|---|---|---|---|---|---|
| | a | d | g | j | $X = a \wedge d \wedge g \wedge j$ |
| | b | e | h | k | $Y = b \wedge e \wedge h \wedge k$ |
| | c | f | i | l | $Z = c \wedge f \wedge i \wedge l$ |
| | X | Y | Z | $Q = X \wedge Y \wedge Z$ | |

700

| 320 / 702 | D0 | D1 | D2 | D3 | D4 | D5 | D6 | D7 | D8 | D9 | D10 | D11 |
|---|---|---|---|---|---|---|---|---|---|---|---|---|
| SP 0 | A | | | | | | | | | | | |
| SP 1 | X | A | | | | | | | | | | |
| SP 2 | Y | X | A | | | | | | | | | |
| SP 3 | Z | Y | X | A | | | | | | | | |
| SP 4 | B | Z | Y | X | A | | | | | | | |
| SP 5 | C | B | Z | Y | X | A | | | | | | |
| SP 6 | | C | B | Z | Y | X | A | | | | | |
| SP 7 | | | C | B | Z | Y | X | A | | | | |
| T_FAIL | | | | | | | | | | | | |
| SP 8 | | | | C | | B+ | B+ | B+ | A | | | |
| SP 9 | | | | | | C+ | C+ | C+ | X | A | | |
| SP 10 | | | | | | | | | Y | X | A | |
| SP 11 | | | | | | | | | Z | Y | X | A |
| SP 12 | A | | | | | | | | B | Z | Y | X |
| SP 13 | X | A | | | | | | | C | B | Z | Y |
| SP 14 | Y | X | A | | | | | | | C | B | Z |
| SP 15 | Z | Y | X | A | | | | | | | C | B |
| SP 16 | B | Z | Y | X | | A+ | A+ | A+ | | | | C |
| SP 17 | C | B | Z | Y | | X+ | X+ | X+ | | | | |
| SP 18 | | C | B | Z | | Y+ | Y+ | Y+ | | | | |
| SP 19 | | | C | B | | Z+ | Z+ | Z+ | | | | |
| SP 20 | | | | C | | B+ | B+ | B+ | A | | | |
| SP 21 | | | | | | C+ | C+ | C+ | X | A | | |
| SP 22 | | | | | | | | | Y | X | A | |

FIG. 7

METHOD AND APPARATUS FOR STRIPING DATA ONTO A PLURALITY OF DISK DRIVES

FIELD OF THE INVENTION

This invention generally relates to the field of storing data on an array of storage devices, and more specifically, a method and apparatus for striping data across a redundant array of inexpensive disks (RAID).

BACKGROUND OF THE INVENTION

The principal requirements of a video server are the abilities to store multiple video files, as well as to continually stream any one of these files to any one of a server's multiple clients. A typical large-scale server will hold several hundred video files and be capable of streaming this data to several hundred clients contemporaneously. In order for the clients to view the video without interruption, and without a large buffer required at each client site, the server must output each client's stream without interruption. Further, each client must have access to any video file on the server, so that, for example, every client could view the same file simultaneously, or each client could view a different file. Generally, video servers are capable of "VCR-like" functionality that displays a video file in normal, fast-forward, or rewind mode. This functionality generates an additional requirement on the server that a user's viewing mode changes do not incur a long latency delay, such as, for example, changes from "normal mode" to "fast-forward" should occur quickly.

These video server requirements are generally met by a server design that stripes the multiple video files across an array of hard disk drives (hereinafter "disks"). In one type of server configuration, the server streams the video files at multiple constant bitrates (MCBR). Every video file on a MCBR server is streamed out at a constant bitrate, and that bitrate may be different amongst different files on the server. A given video file on a MCBR server is divided into constant sized segments called "extents," with all the data in a given extent written contiguously on one hard disk in the server's disk drive array. The amount of time it takes to output one extent of a video file is called the "service period." Since each extent in a given video file is the same size, and since the file is output at a constant bitrate, that service period is the same for each extent of a given video file. Accordingly, one design for a MCBR server makes the service period the same for each of the server's files. As such, if file A is illustratively output at twice the bitrate of file B, then file A's extent size is twice the size of file B's.

In order to allow any (or all) of the server's clients to view a given video file at the same time, the extents are striped across the server's disk drive array. For example, if the disk drive array has D disks numbered 0 through D−1, and a given video file on the server has N extents numbered 0 through N−1. Then, if extent 0 is stored on disk J, extent 1 will be stored on disk J+1 (modulo D), and extent 2 will be on disk J+2 (modulo D), and so on. In this manner a client viewing the file "walks" around the disk drive array, reading one or a few extents at a time, outputting those extents, and then reading more. Multiple clients can view the same file because the file is not isolated on any one disk. Further, the server can support multiple clients viewing different files of different bitrates because all the clients "walk" around the disk drive array at the same rate and in sync, since the service period is the same for all of the server's files.

Because hard disks occasionally fail, the data striping generally uses some form of RAID parity protection, so that the content of the failed disk drive can be regenerated if a single disk fails.

FIG. 1 illustratively depicts a disk drive array 100 having data striped in a RAID-3 format. Specifically, the top row of boxes represents each disk 102 in the array of disks (e.g., 15 disks D0 through D14). Furthermore, each box below each disk in the array of disks represents an extent of data $110_1$ though $110_p$ (collectively extents 110). FIG. 1 illustratively shows two files, file A and file B, each 16 extents long, striped cross a disk drive array consisting of 15 disks total. The disk drive array 100 is broken into 3 parity groups $104_1$ through $104_3$ (collectively parity groups 104) of 5 disks each, with each parity group 104 respectively consisting of 4 data disks $106_1$ through $106_3$ (collectively data disks 106) and 1 parity disk $108_1$ through $108_3$ (collectively parity disk 108). For example, a first parity group 104 comprises the first four extents of file A (i.e., extents A0–A3) illustratively written onto disks D5–8, plus the parity extent (i.e., the byte-by-byte XOR of these 4 data extents) written onto disk D9. In RAID 3, all files on the server use the same sized parity groups, so that certain disks in the array contain only parity data. In FIG. 1, the disks containing only parity data are disks 4, 9, and 14.

Reads from the RAID 3 formatted disk drive array 100 can proceed according to two different modes of operation. In a first mode of operation, a server must provide realtime correction of a failed extent read attempt without any delay, then all 5 extents in a parity group need to read simultaneously. All of the extents 110 in a parity group 104 must be read simultaneously so that a parity correction (i.e., using an XOR Boolean logic operative) can be performed immediately if any one of the 4 data extents 106 is unsuccessfully read.

In a second mode of operation, the server uses the parity data only for regeneration of content in the advent of a failed disk. As such, the extents 110 can be read sequentially one-by-one, with extent "1" read one service period after extent "0", and extent "2" read one service period after extent "1", and so forth, and with the parity extents 104 not read at all in normal operation. In this latter case, all of the clients using the server will glitch each time they attempt to read from the failed disk, until the failed disk is replaced and its data rebuilt from parity.

One problem with the realtime correction mode of operation is that the parity data 108 is read from the disk drive array 100 even when the array has no failed disk and is experiencing no disk errors in general. As such, the wasted disk-to-server bandwidth reading the parity disk adds to the cost for the ability to perform immediate correction of any failed read attempt. Another problem associated with realtime parity correction is related to the amount of buffer memory on the server. In particular, the server is required to have about twice as much memory in order to hold a full parity group's worth of user data at a time, rather than just 1–2 extents. Alternately, the extent size could be decreased by about 50%, which would keep the total amount of server memory the same. However, reducing the extent size drastically impairs the efficiency of extracting data from the hard disks. Therefore, the price in terms of buffer memory and unused disk bandwidth in realtime parity correction in a RAID 3 format is substantial.

FIG. 2 illustratively depicts a disk drive array 200 having data striped in a RAID-5 format. Specifically, FIG. 2 shows the same two files "A" and "B" of FIG. 1 striped across a disk drive array 200 consisting of 12 disks (recall that in the RAID 3 example, 15 disks were used). The parity group 104 is the same size as in FIG. 1 (1 parity extent 108 for four data extents 106). For example, the first parity group 104 for the file "A" comprises data extents A0–A3 106 plus the single parity extent 108.

One distinction between the RAID 5 format of FIG. 2 and the RAID 3 format of FIG. 1 is that there are no dedicated parity disks. Referring to FIG. 1, every file in the RAID 3 system had to start on either disk 0, 4 or 8 in order to keep the parity groups aligned. In a RAID 5 system, however, a file can have its first extent on any disk in the array so that the parity groups 104 do not align between different files. In fact, the parity data 106 must be evenly distributed across all disks in the array for the RAID 5 system to perform properly. For example, in FIG. 2, the data extents A0–A3 104 are stored on disks D3–D6, and the corresponding parity extent 108 is stored on disk D7. The next parity group 104 (i.e., extents A4–A7) begins on the disk (i.e., D7) following the last disk of the previous data extents (i.e., disk D6). As such, each successive disk stores at least one extent of data 106, and may store a parity extent 108 as well.

The advantages of RAID 5 over RAID 3 are twofold: First, for a given amount of server buffer memory, larger extents can be used, thereby allowing data to be extracted more efficiently off each hard disk. This follows since the data reads can proceed by a single extent at a time, rather than a full parity group at a time. The second advantage is with regard to disk-to-server bandwidth efficiency. In particular, the D disks in a RAID 5 array provide D disks worth of true (non-parity) data bandwidth. By contrast, the D disks in a RAID 3 array provide only $D*P/(P+1)$ disks worth of true data bandwidth, where P is the number of data extents in a parity group (e.g., P=4 in FIGS. 1 and 2). Thus, in a RAID 3 format, one disk out of each P+1 does not deliver true data.

The disadvantage of RAID 5 compared to RAID 3 is that, unless the number of users of the server is limited to a number much less than the maximum possible, no realtime correction from parity is possible in RAID 5, since there are no dedicated parity disks in RAID 5. Thus, RAID 5 can only be used to regenerate the files on the array after a failed disk is replaced, and cannot immediately correct all failed read attempts for all the users of the server. Therefore, there is a need in the art of an improved method and apparatus for striping data onto a disk drive array.

SUMMARY OF INVENTION

The disadvantages discussed above are overcome and additional features are disclosed by a method and apparatus for recovering data from a failed disk drive in a disk drive array. The disk drive array comprises a plurality of serially coupled disk drives, where the plurality of disk drives have a plurality of extents apportioned equally into a plurality of parity groups, and the disk drive array is coupled to a server having a buffer memory. The method includes striping data from at least one file sequentially across the plurality of parity groups in the plurality of disk drives, and in an instance where a disk drive fails, identifying the at least one failed parity group containing the failed disk drive. The method then outputs data in realtime to users in a normal disk access mode from parity groups without the failed disk drive, and outputs data in realtime to the users in a parity correction mode from the parity group containing the failed disk drive.

In one embodiment, each parity group comprises one extent from each disk drive in the parity group. The data stored in each extent in the parity group is divided into data segments, where a parity segment is appended to a bottom portion of each data extent. Each parity segment contains parity information for the data segments in the parity group. During the normal disk access mode of operation, the users of the server sequentially access each extent in the parity groups in the disk drive array. Only the data segments in the extents are accessed by the user.

In an instance of a disk drive failing in the disk drive array, the disk drive is identified by the server as belonging to a parity group that is deemed "a failed parity group." The failed drive is no longer accessed, and the failed parity group operates under a parity correction mode.

In particular, the users that are trying to access the failed parity group at some service period receive the data from the failed drive by virtue of a RAID 3+5 regeneration disk algorithm. The RAID 3+5 regeneration disk algorithm reconstructs the data "lost" in the failed extent of the failed parity group by accessing the parity segments of the failed parity group. The parity segments, in combination with the data on the extents from the operable disk drives in the parity group, are used to reconstruct the lost extent data using a Boolean logic Exclusive OR operative.

Once the lost data is reconstructed and the data from the extents in the operative disks in the parity group have been sent to the users, the parity correction mode transitions back to the normal disk access mode of operation. As such, the parity correction mode of operation occurs only during user access of the failed parity group, and returns to the normal disk access mode of operation for accessing the non-failed parity groups.

In another embodiment of the invention, the stochastic nature of users accessing the disk drive array takes into account the increased extent size, which occurs during the parity correction mode. In particular, during the parity correction mode, the entire extent (data segments plus parity segment) in the failed parity group is read. Without accounting for the increased size in the extent, the probability of the users missing disk access deadlines will increase. However, by adjusting for larger expected extent sizes, the users will be spread out across the disk drive array more than needed for their normal extent sizes in the normal mode of operation. Furthermore, as the user population accessing the disk drives grows, the users will be able to withstand the larger extent size reads during the parity correction mode without causing an unacceptable missed deadline rate for the users. Therefore, setting the expected user access rate at a value higher than the actual user access rate, leads to less chance of a high density distribution of users on a single disk at one time, and reduces the likelihood of a user missing a deadline to access the disk.

BRIEF DESCRIPTION OF THE DRAWINGS

FIG. 2 illustratively depicts a disk drive array 200 having data striped in a RAID-5 format;

FIG. 4 depicts RAID 3+5 data striping across a plurality of extents of a parity group;

FIG. 7 depicts a disk access pattern utilizing the RAID 3+5 disk regeneration algorithm across the disk drive array of FIG. 5.

To facilitate understanding, identical reference numerals have been used, where possible, to designate identical elements that are common to the figures.

DETAILED DESCRIPTION OF THE INVENTION

The disadvantages of the RAID 3 and RAID 5 data striping formats are overcome, and synergistic benefits are achieved by implementing a method for using a hybrid "RAID 3+5" data striping format and regeneration algorithm, which combines the advantageous features of both RAID 3 and RAID 5 data striping formats. In addition, a method for providing user disk access admission in an interactive video-on-demand distribution system using the RAID 3+5 data striping format and regeneration algorithm is provided. In the RAID 3+5 data striping format, the data striping allows realtime correction of failed disk reads, while also not wasting any disk-to-server bandwidth when the disk drive array is not experiencing any failures.

The RAID 3+5 data striping format is illustratively depicted and discussed in terms of an interactive video-on-demand (VOD) distribution system. However, such interactive VOD distribution system should not be considered as limiting. Rather, the RAID 3+5 data striping format may be implemented on any information system utilizing an array of disks (e.g., audio distribution systems), where files of information are stored and each file may be simultaneously distributed (e.g., streamed) to a plurality of users or subscribers.

Figure 3:
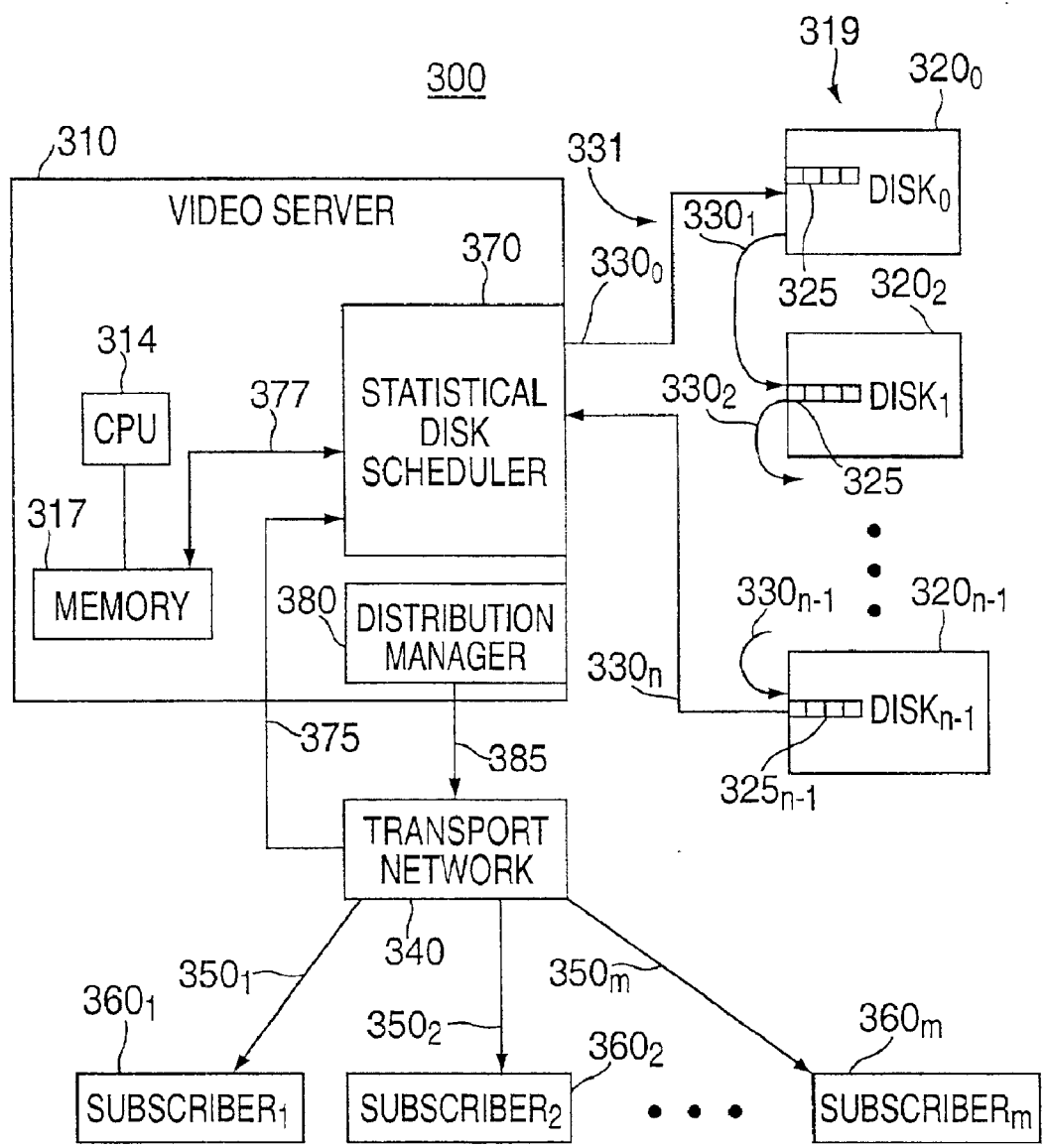
FIG. 3 depicts an illustrative interactive VOD distribution system 300 of the present invention.

FIG. 3 depicts an illustrative interactive VOD distribution system 300 incorporating the teachings of the present invention. Specifically, the illustrative VOD distribution system 300 contains a video server 310 that communicates with a disk drive array 319 via a Statistical Disk Scheduler (SDS) 370. The disk drive array 319 contains a plurality of disks $320_0$ through $320_{n-1}$ (collectively disks 320) coupled serially in a data transfer loop 331. In addition to the SDS 370, video server 310 contains a central processing unit (CPU) 314 and memory element 317. The SDS 370 is coupled to the plurality of disk drives (hereinafter "disks") 320 by paths $330_0$ through $330_n$ (collectively paths 330) (e.g., fiber-channel), and to the memory 317 by data path 377. The video server sends access requests along paths 330 to disks 320, and each disk 320 has its own internal queue $325_0$ through $325_{n-1}$ (collectively queues 325) for buffering access requests. Data read from the disks 320 are transmitted back to the video server 110 along paths 330. The paths 330 are serially coupled, i.e., "daisy chained" to form the loop 331, e.g., a fiber-channel loop. Although one loop is depicted, multiple loops may be employed to interconnect subsets of the disk drives 320 such that the data transfer rate amongst the disk drives 320 and the video server 310 is increased over that of the single loop system 331.

The video server contains a Distribution Manager 380, which receives the data transmitted along paths 330 and loop 331 and distributes this data to subscribers $360_1$ through $360_m$ (collectively subscribers 360) via a transport network 340. The transport network 340 is typically, but not exclusively, a conventional bi-directional hybrid fiber-coaxial cable network. Subscribers 160 are coupled to the transport network 340 by paths $350_1$ through $350_m$ (collectively transport network paths 350) (e.g., coaxial cable). Additionally, the transport network 340 forwards subscriber access requests along path 375 to the SDS 370, and receives video data from Distribution Manager 380 via path 385.

Commonly assigned U.S. Pat. No. 6,253,375, issued Jun. 26, 2001, which is incorporated herein by reference, describes an information distribution system known as the ONSET™ system that uses a video server that may benefit from the present invention. Additionally, the video server of the ONSET™ system is described in U.S. Pat. Nos. 5,671, 377 and 5,581,778, which are each herein incorporated by reference as well.

FIG. 4 depicts a RAID 3+5 data striping format across a plurality of extents in the disks 320 in a single parity group 404. The parity group 404 is illustratively depicted as having four data extents 406 (extents 0–3) containing data (e.g., video information). Each data extent 406 is divided into segments $402_1$ to $402_3$ (collectively segments 402). The number of segments 402 in each extent containing data is equal to P–1, where P equals the number of disks 320 in a parity group 404. For example, the true (non-parity) data of extent 0 $110_0$ is divided into three segments (a, b and c). The true data of extent 1 $110_1$ is divided into segments d, e, and f. The true data of extent 2 $110_2$ is divided into segments g, h, and i, and the true data of extent 3 $110_3$ is divided into segments j, k, and l.

The parity column 408 is a representation of the parity information for the segments as the data is stored across the parity group 404. For instance, the parity data "X" for the first row of extent segments $402_1$ includes the data in segments a, d, g, and j of extents 0–3, respectively. Similarly, the parity data "Y" for the second row of extent segments $402_2$ includes the data in segments b, e, h, and k of extents 0–3, respectively. Furthermore, the parity data "Z" for the third row of extent segments $402_3$ includes the data in segments c, f, i, and l of extents 0–3, respectively. It should be noted that the parity information in column 408 is not a physical disk drive 320 that stores the parity information. Rather, column 408 is simply a representation of the parity information for the four data extents 406 of the parity group 404.

The basic concept underlying the RAID 3+5 data striping format is to perform RAID 3 striping across the disk drive array 319, where parity information for the extents in each group of data disks 320 is attached at the bottom of each data extent. The extents 110 depicted in FIG. 4 are representative of any parity group on a group of disks. Referring to FIG. 2, for example, extents 0–3 could illustratively be the extents associated with file "A", which are respectively stored on disks D3–D6. Similarly, extents 0–3 could illustratively be the extents associated with file B, which are respectively stored on disks D8–D11. As such, a denotation regarding which disks the extents are associated with is not important in this regard for explaining the RAID 3+5 data striping format.

Figure 1:
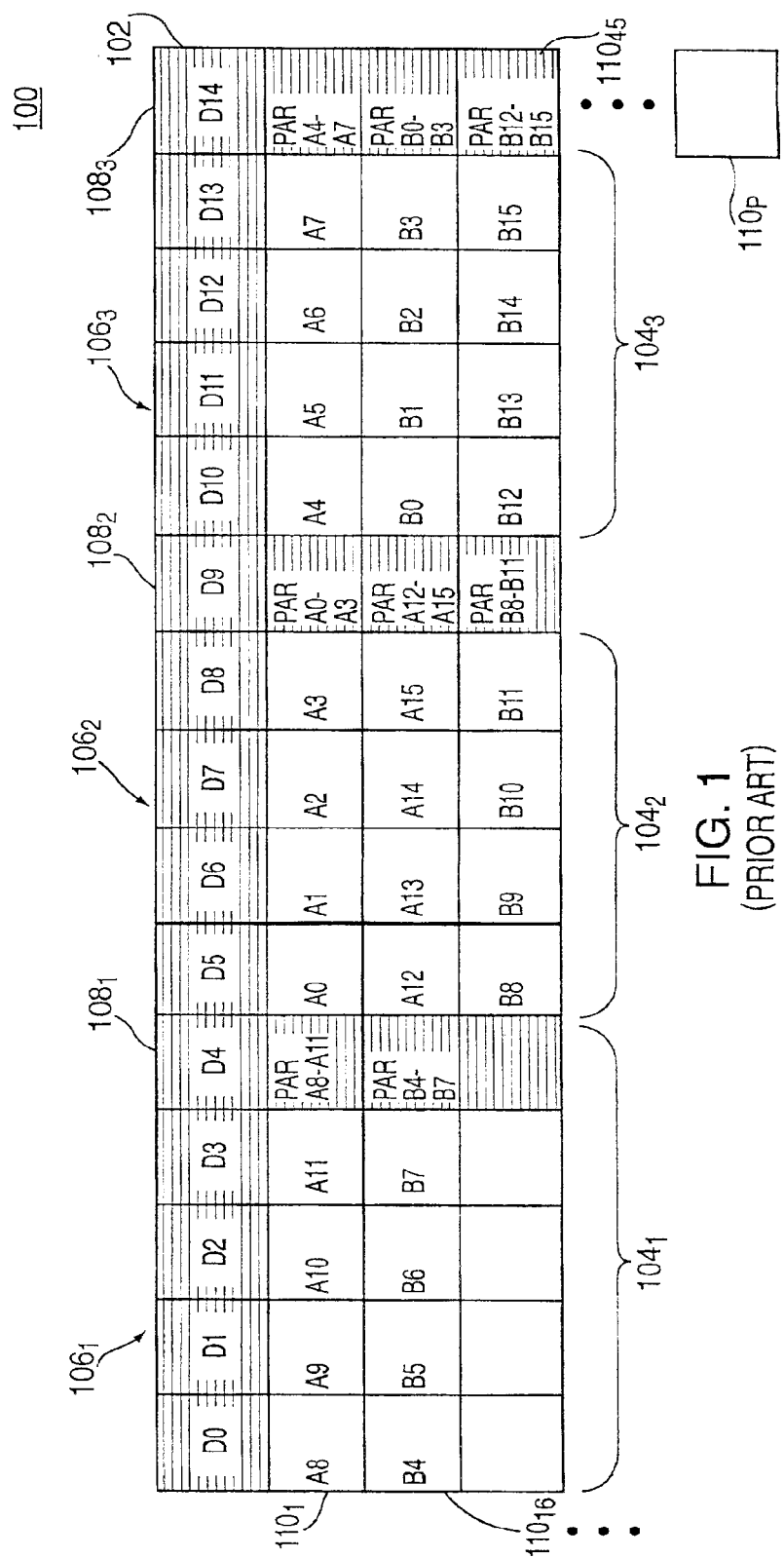
FIG. 1 illustratively depicts a disk drive array having data striped in a RAID-3 format.

At the bottom of extent 0 $110_0$ is appended the parity segment X $410_0$, which contains the parity data of the first segments $402_1$ of each extent (X=a^d^g^j) in the parity group 404, where "^" indicates a Boolean logic "exclusive OR" (XOR) operative. Similarly, at the bottom of extent 1 $110_1$ is appended the parity segment Y $410_1$, which contains the parity data of the second segments $402_2$ of each extent (Y=b^e^h^k) in the parity group 404. Likewise, at the bottom of extent $_2$ 1102 is appended the parity segment Z 4102, which contains the parity data of the third segments $402_2$ of each extent (Z=c^f^i^l) in the parity group 404. Furthermore, at the bottom of the last extent $110_3$ (i.e., extent 3) is appended the parity segment "Q" $410_3$, which contains the parity information of the 3 parity segments X, Y, and Z, where Q=X^Y^Z. Thus, in the inventive RAID 3+5 format, the "pure parity" disks required for RAID 3 (see FIG. 1) are eliminated from the disk drive array 319.

During a normal mode of operation (i.e., non disk failure mode), only the non-parity segments of each extent is read (i.e., segments $402_1$ through $402_3$), while the bottom segment 410 containing the parity information is not read. When a particular disk experiences a sufficiently high frequency of failed read attempts to be declared "bad" by the server 310, a disk regeneration algorithm (i.e., RAID 3+5 algorithm) transitions to a parity correction mode of operation. During the parity correction mode of operation, the bad disk is no longer accessed, however the full (data plus parity) extents on the other disks are read in the parity group 404. The parity information 410 is then used to reconstruct (regenerate) the missing true data from the defective disk. From this point on, realtime parity correction can be performed to correct failed reads from the defective disk. Furthermore, disk replacement and a rebuild of the data on the disk drive array 319 can proceed as well.

In an instance where the last disk in the group 404 is illustratively defective (e.g., extent 3 data), then the missing data is obtained directly through parity segments X, Y, and Z $410_0$, $410_1$, and $410_2$ stored in extents 0–2 $110_0$ through $110_2$. If, however, the bad disk in the parity group 404 is any other disk, then an extra step in parity correction is required. In particular, if the first disk in the group failed (e.g., extent 0 data) then the parity segment X must first be regenerated from the parity segments Y $410_1$, Z $410_2$, and Q $410_3$, where X=Q^Y^Z.

To understand the extra step in partly correction used by the RAID 3+5 algorithm, it is instructional to compare the parity correction in the RAID 3 or RAID 5 formats. Specifically, in the RAID 3 or 5 formats, if the first disk in the group failed, then the first segment of that extent (e.g., segment "a" in FIG. 4) is regenerated from a=d^g^j^X (where X is on a separate parity disk in RAID 3), which requires three XOR ("^") logic operatives. Furthermore, segments "b" and "c" in the first disk are readily accessible, as they are respectively stored in the parity segments $404_1$ and $404_2$ of extents 1 and 2. To regenerate segments "b" and "c" of the first extent 0 $110_0$, b=e^h ^k ^Y and c=f^i^l^Z, three XOR logic operatives are require to regenerate each segment "b" and "c". As such, using either RAID 3 or RAID 5, a total of 9 XOR logic operatives must be performed to recover the missing data.

By contrast, in the RAID 3+5 algorithm, the first segment of the extent "a" is regenerated from a=d^g^j^Q^Y^Z, which is five XOR logic operatives. Regenerating the remainder of extent 0 (b and c) proceeds normally (three XOR operations each), without any additional work. Therefore, regeneration of the full extent using the RAID 3+5 algorithm requires eleven XOR logic operatives (5+3+3). As such, the RAID 3+5 algorithm requires an additional 2/9 (or 22%) of parity correction (i.e., "XOR'ing"). In the general case of a parity group 404 consisting of P data extents 110, the fractional additional work is equal to (P−2)/[(P−1)*(P−1)] (referring to the example discussed above, P=4).

Figure 5:
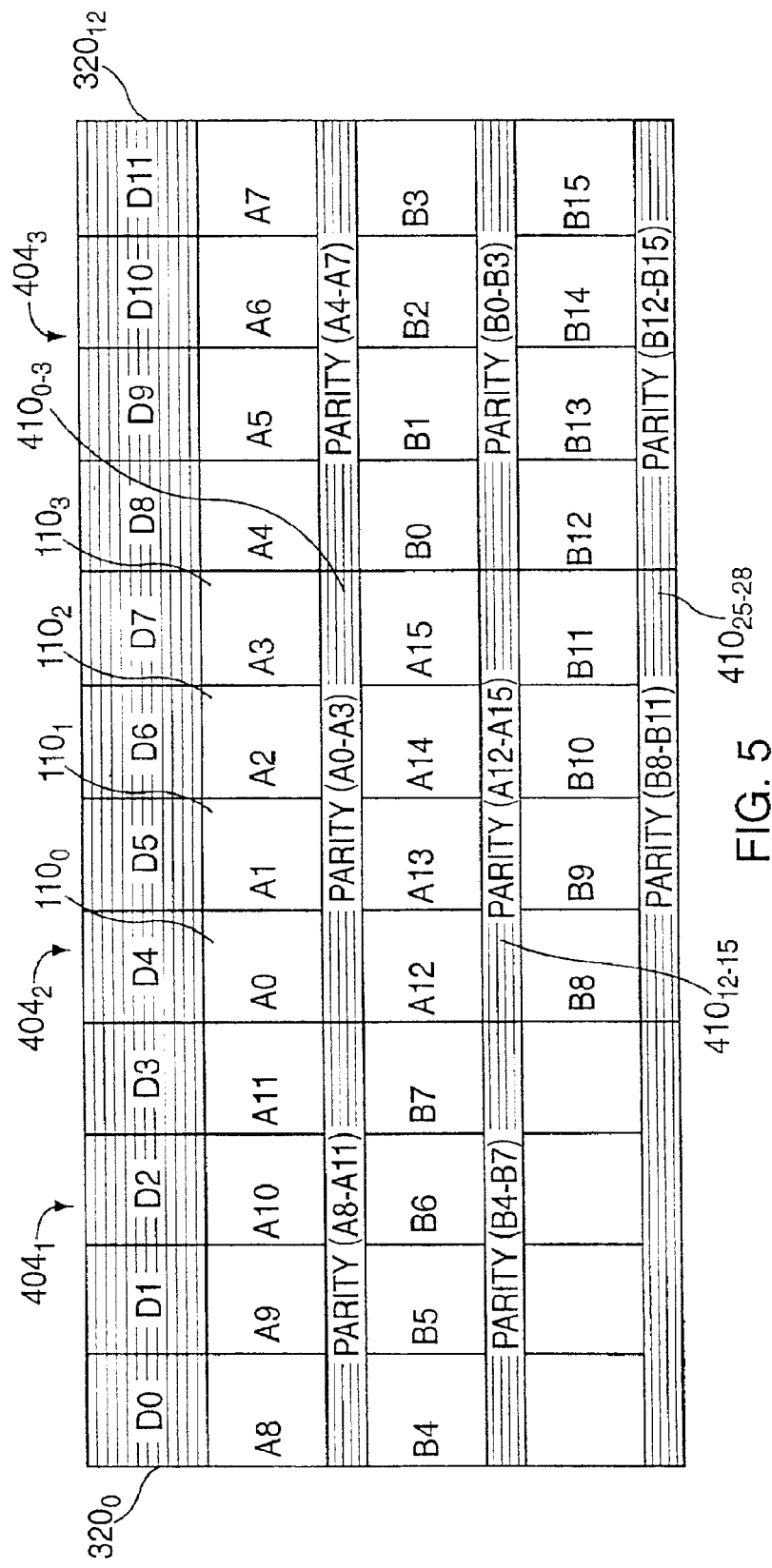
FIG. 5 illustratively depicts RAID 3+5 data striping on a disk drive array.

FIG. 5 illustratively depicts RAID 3+5 data striping on a disk drive array 319. In particular, two files "A" and "B" are striped on an array 319 containing 12 disks (the same size as in the RAID 5 example of FIG. 2). Similar to the parity group of FIGS. 1 and 2, the parity group 404 comprises 4 data extents 110, however each extent also contains a segment of the parity information 410. As in RAID 3, the parity groups 404 must remain aligned amongst all the different files on the disk drive array 319. Thus, every file has its first extent written on a disk having a number that is an integral multiple of the parity group size P.

In the example depicted in FIG. 5, disks D0, D4, and D8 represent the disk drives having a number that is an integral multiple of the parity group size P. As such, the first extent of a file may be stored on disks D0, D4, and D8. Furthermore, the information representing the parity information for the data segments across the extents in the parity group 404, is provided as an additional segment appended to the bottom of each extent 110 on each disk 320, as discussed above with regard to FIG. 4. For example, assuming the extents 0–3 shown in FIG. 4 contain data for file "A" are stored on disks D4–7, then the parity segments A0–A3 in FIG. 5 contain the parity segments X, Y, Z, and Q ($410_{1-3}$) as illustratively provided in FIG. 4.

The RAID 3+5 data striping format may be utilized in an interactive information distribution system such as an interactive video-on-demand (VOD) distribution system as shown in FIG. 3. Providing VOD to multiple subscribers places stringent demands and specific requirements on the VOD service provider equipment 300. In particular, a VOD distribution system 300 having a disk drive array 319 utilizing the RAID 3+5 striping format is designed to operate in two different modes of operation. A first mode of operation is a "normal" mode, where none of the disks are having an excessive amount of read errors. The second mode of operation is a "parity correction" mode, where at least one parity group has a disk 320 that has been flagged as "bad."

Figure 6:
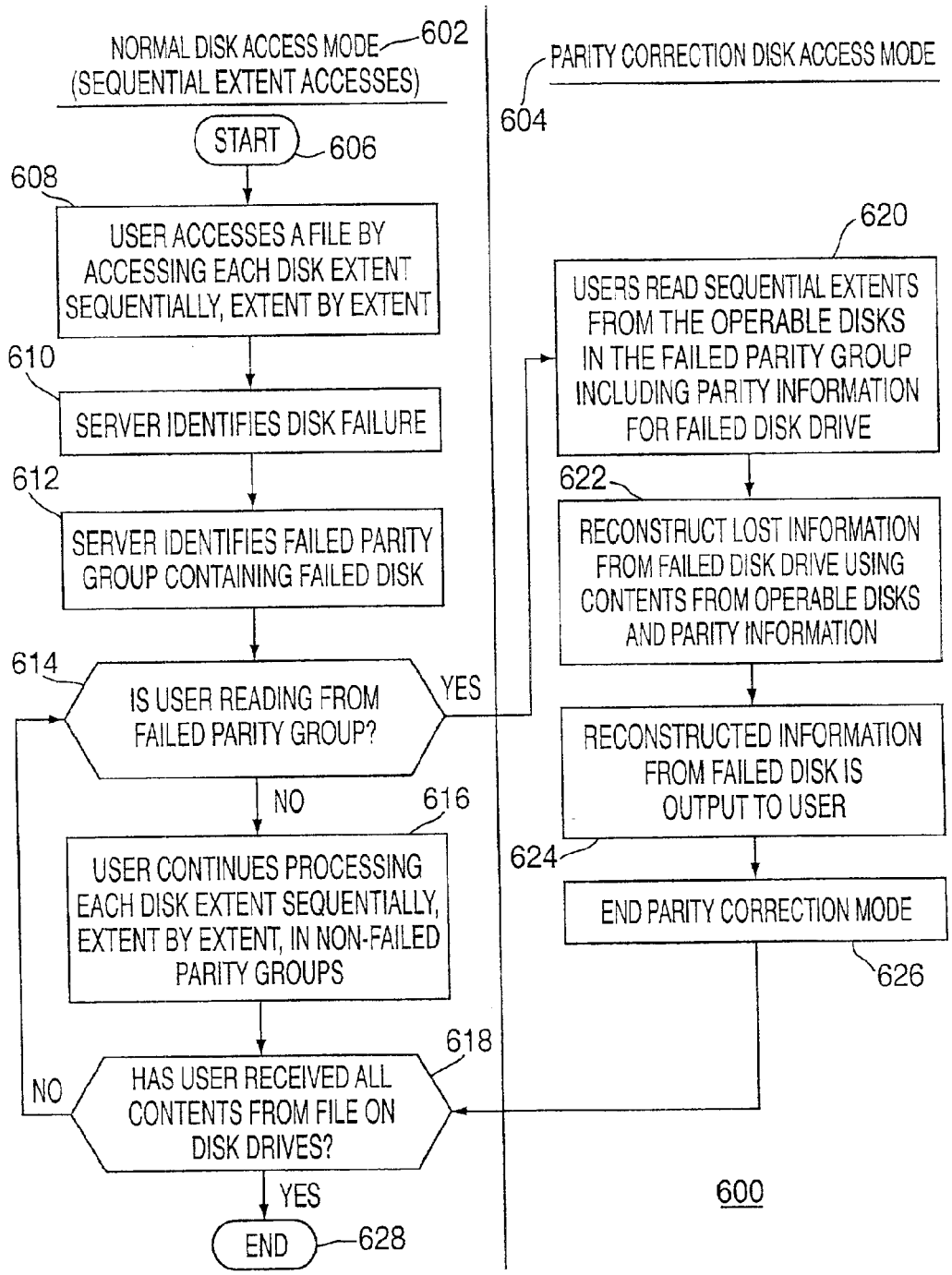
FIG. 6 depicts a flow diagram illustrating a method of transitioning between a normal disk access mode and a parity correction mode of operation during a disk drive failure.

FIG. 6 depicts a flow diagram illustrating a method 600 of transitioning between a normal disk access mode 602 and a parity correction mode 604 of operation during a disk drive failure. The method 600 begins at step 606 in a normal disk access mode of operation, and proceeds to step 608. In step 608, one or more users access a particular file by accessing each successive extent on each successive disk sequentially, extent by extent. That is, in the normal mode of operation, the clients "walk around" the disk drive array reading one extent at a time (as in RAID 5 format). As soon as extent "T" is read from disk "J" and has started to be output for a given client, a request from that client for extent "T+1" is enqueued from disk "J+1" (modulo D). Thus, for a given amount of buffer memory 317 in the server 310, the extent size can be maximized and the server 310 can utilize the disks 320 in the array 319 with maximal bandwidth efficiency. All reads in normal mode of the RAID 3+5 format read only the top true data (i.e. non-parity) portion of each extent.

In step 610, the server 310 monitors the performance of the disks 320 in the array 319 to ensure that the data stored on the disks 320 is streamed to the subscribers with minimal interruption. As soon as the server 310 calculates the success rate of a certain disk has deteriorated below a minimum threshold, it declares that disk as being defective (i.e., bad). In step 612, the server identifies the failed parity group containing the failed disk drive and the server 310 stops accessing that defective disk 320.

In step 614, a first query is made to determine whether the user is reading from the failed parity group. If the query in step 614 is answered negatively, the method 600 proceeds to step 616 and continues in the normal disk access mode for the parity groups that do not have the defective disk drive. After each parity group is accessed and the data is illustratively streamed to the user, in step 618, the method 600 performs a second query to determine if the user has received all of the contents in the extents of the file. If the query is answered affirmatively, then the method 600 ends at step 628. However, if, in step 618, the query is answered negatively, then the method 600 returns to step 614 where the query is made again to determine if the user is currently trying to access a failed parity group. The method 600 continues in the loop between steps 614 and 618 until in step 614, the query is answered affirmatively. That is, the user is trying to access extents in a parity group containing a failed disk drive.

The method 600 then transitions from the normal disk access mode of operation 602 to a parity correction mode of operation 604. In step 620, the disk regeneration algorithm for the parity group containing the failed disk is utilized. That is, the user reads sequentially the full extents (i.e., true data segments and parity segments) from the operable disk drives in the failed parity group. In step 622, the server reconstructs the lost information from the failed disk drive using the XOR logic operatives on the existing data and parity information in the segments of the operable disk drives in the failed parity group. In step 624, the method 600 then outputs the recovered information from the failed disk to the user. Moreover, in step 626, the disk regeneration algorithm terminates and the parity correction mode transitions back to the normal disk access mode of operation for the non-failed parity groups in the array 319. That is, extent-by-extent sequential reading of only the data segments of each extent is performed on those disks in the non-failed parity groups. Specifically, the method 600 returns to step 618. Furthermore, the method 600 continues through steps 610 through 626, until the user has received all of the file contents requested where the method proceeds to step 628 and ends.

In a failed parity group the server operates in a parity correction mode where the disk regeneration algorithm enables the user to read all of the P-1 extents in the group simultaneously (i.e., the group has P extents, but the bad disk is not read). The simultaneous reads from these P-1 disks retrieve the full contents in the extents. Specifically, both the top true data portion and the bottom parity data portion are read in the failed parity group. The retrieved parity data is used to reconstruct the missing data (e.g., video data) that normally resided on the bad disk as discussed with regard to FIGS. 4 and 5. When the user leaves the failed parity group having the defective disk, the user's disk accesses are transitioned back to the normal disk access pattern (non-parity correcting mode) of sequential extent accesses.

It is further noted that the above disk access algorithm presents an intermediate solution to the dilemma of how to obtain realtime parity correction without requiring an excessive amount of memory buffer in the server, and without giving up the efficient disk usage enabled by large extent reads. The RAID 3+5 disk regeneration algorithm accomplishes this by providing the parity correction only in the parity group having the failed disk. As such, the server memory buffer needs to be sized to allow one parity group's worth of users to instantaneously read a full parity group's worth of data. If the full disk array contains more than one parity group, this is a substantial savings over the typical RAID 3 design, where instantaneous parity correction is ensured by always reading the full parity group's worth of data of all disks at all times. Furthermore, it is noteworthy that a disk drive array striped in RAID 3 can also be accessed with the same algorithm as above (i.e. performing sequential extent no-parity reads until a disk is determined bad, and then performing group-by-group parity correcting reads only in the failed group). However, the advantage of the RAID 3+5 format over the RAID 3 format is that in the normal disk access pattern (non-parity-correcting mode of operation), none of the disks in a RAID 3+5 array are sitting idle.

FIG. 7 depicts a disk access pattern 700 utilizing the RAID 3+5 disk access algorithm across the disk drive array 319 of FIG. 5. The disk access pattern 700 illustrates a method for transitioning from the normal mode sequential extent disk reading (no disk failures) to the parity correcting mode disk access pattern when a disk is flagged as defective. FIG. 7 forms a table having columns formed by the 12 disks D0–D11 320 as discussed with regard to FIG. 5, and a plurality of rows forming service periods ("SP") 702, for example, SP 0 through SP 22. The service periods SP represent the amount of time it takes to output one extent, and each service period equals time "T". FIG. 7 illustrates a set of clients requesting data from disk 0 in SP0 is labeled user group "A". Furthermore, the clients requesting data from disk 0 in service periods 1–5 are respectively designated user groups "X", "Y", "Z", "B" and "C". These five user groups may be reading information from the same file or different files.

In the normal mode of operation (i.e., no disks have failed), the users in group A access the first disk D0. At SP 1, users in group A access the second disk D1, while the users in group X access the first disk DO. At SP 2, the users of group A access the third disk D2, the users in group X access the second disk D2, and users in group Y access the first disk D1. At SP 3, the users of group Z access disk DO, the users of group Y access disk D1, and so forth. Finally, during service period SP 5, the users of group C access disk D0. As such, the users in group A access the disk drive array 319 one service period ahead of the users in group X, which access the disk drive array 319 one service period ahead of the users in group Y, and so forth.

FIG. 7 also illustratively shows that at some instant in time "t_fail", disk 4 is determined to be "bad" by the server 310 such that t_fail=8T. That is, between the service periods SP 7 and SP 8, the server 310 determines that the success rate of disk 4 has deteriorated below a minimum threshold, and declares disk 4 as being defective (i.e., "bad"). After time t_fail, the server 310 switches to the parity correction mode of operation where the disk regeneration algorithm is employed. That is, all of the users (e.g., users A, B, C, X, Y, and Z) reading from the failed parity group 410 have the data from the bad disk regenerated by the group-by-group parity correcting reads as discussed above.

For example, referring to FIG. 5, if disk D5 fails, then any user group reading, for example, the file contents stored in parity group A12–A15, will have the data in disk D5 regenerated from the parity segments (A12–A15) $410_{12-15}$. Similarly, if another user group is accessing the file contents stored in parity group B8–B11, the data in disk D5 is regenerated from the parity segments (B8–B11) $410_{25-28}$. In contrast, when the users read from the disks 320 in the other two parity groups (e.g., parity groups $404_1$ and $404_3$), then the normal disk access pattern (i.e., sequential extent reads) is utilized.

Referring to FIG. 7, the parity correcting reads in the failed parity group 704 are only for 3 out of the group's 4 disks 320 (i.e., disks D5, D6, and D7 of the failed parity group). Each read is for the full extent (data segments 402 plus parity segments 410, which is depicted with a "+" after the group name). The failure time t_fail=8T is the juncture between SP7 and SP8. Had there been no disk failure declared at that instant, users B would access disk 4, users Z disk 5, users Y disk 6, and users X disk 7 in the ensuing service period. However, as shown in the FIG. 7, the transitioning to the disk regeneration pattern for the parity group has preempted the normal single disk reads of user groups X, Y and Z with a full group read by user group B (denoted B+). It is also noted that if the user groups are not completely full, this disruption may not occur.

The cost of transitioning to the disk regeneration pattern is that users in group X will incur an interruption of their streams lasting one service period, users in group Y will incur a stream outage for two service periods, and users in group Z will go without any data for three service periods. This temporary interruption of the streams of three disks worth of users (25% of the users in the 12 disk drive array example shown here) is a one-time occurrence. After the disk access pattern switches to the parity correction mode, the users in groups X, Y and Z suffer their one-time stream outage, and thereafter, all subsequent disk accesses by any of the users is without delay.

For example, at SP 12, user group A accesses disk D0 and continues across the parity group of disks D0–D3 each successive service period. At SP 16, the users in group A would normally read from disk D4 at SP 17. However, since disk D4 has failed, the data in the extents of the remaining disks D5–D7 in the failed parity group are read together in the service period SP 17. As such, the data from disk D4 is regenerated from the data in the extents of disks D5–D7, which satisfies the user group A disk access requirement for SP 17. Furthermore, since the information from the extents of disks D5–D7 is also buffered in memory (designated by the "+" symbol for users A) there is enough buffered information to stream to users of group A through the service period SP 20.

Specifically, the portion of data buffered in server memory, which is represented by the notation A+ in cell D5 and SP 16, is transferred (streamed) to the users in group A during SP 17. Similarly, the portion of data buffered in server memory, which is represented by the notation A+ in cell D6 and SP 16, is transferred (streamed) to the users in group A during SP 18. Furthermore, the portion of data buffered in server memory, which is represented by the notation A+ in cell D7 and SP 16, is transferred (Streamed) to the users in group A during SP 19. During the service period SP 20, the server 310 transitions from the parity correction mode using the disk regeneration algorithm, back to the normal disk access pattern, and would not have to transition back again to the parity correction mode until service period SP 28 (not shown). Furthermore, a similar analysis is applicable for users in groups X, Y, Z, B, and C.

During the RAID 3+5 disk regeneration algorithm, the users are extracting P disks worth of data from only P−1 actual disks, so those remaining disks are delivering an extra 1/(P−1) of bandwidth (an extra 33% when P=4). This poses a problem regarding how users read the extra parity data from the remaining disks in the failed group without taking so much extra time to do so, such that subsequent users in the failed group have their disk reads delayed and miss their deadlines.

One solution to this problem comes from the design of user disk access admission algorithm employed to admit new clients onto the server. Commonly assigned U.S. Pat. No. 6,378,036, issued Apr. 23, 2002, which is incorporated herein by reference, describes an information distribution system that has a queuing architecture including a plurality of queues and an associated method for scheduling disk access requests for video servers. In particular, when a new user (e.g., subscriber for services) requests admission onto the server to begin streaming a particular file (or an existing user requests a mode change), there is a demand to read a new extent off the disk that holds the beginning of the newly requested data. The server's admission policy must ascertain whether that new disk request might impinge on the guaranteed stream delivery for the server's already existing steady-state clients.

One method for doing this is for the server 310 to keep track of each user's position in the disk drive array 319 at all times. Then, if the server 310 has an accurate model of how long disk access times are for different sized extents 110, the server 310 can calculate the likelihood that inserting a new disk request at the front of a disk's queue will cause any dangerous delay to already existing members on the queue. If the queue is already too densely packed with steady state users, the server can delay the new user's entry into the queue until such a time as the wave of dense disk usage passes and the queue opens up. That delay will add latency to the new user's request, but such additional latency is a minimal trade-off for guaranteeing that steady state users already on the server 310 never have their output stream interrupted.

Furthermore, commonly assigned U.S., Pat. No. 6,691,208, issued Feb. 10, 2004, which is herein incorporated by reference, discloses that the servers disk access model may include the stochastic nature of disk access times. For example, the time for a disk to complete a request to read 0.5 megabytes might have an average value of 33 msec, but might range from 25 msec to 80 msec, with the distribution of access times forming a Gaussian-like curve. If the server 310 has an accurate model for those access time probability distribution curves for varying sized extents, the server 310 can determine if a user's admission onto a disk 320 is allowed at a given instant, and delay the user if it is problematic because the disk 320 is too densely populated at that time. In this manner the server's admissions policy "spreads out" all the clients evenly on the disk drive array, making sure that a large number of them do not "clump up" too densely at a particular disk, as they all walk around the disk drive array 319.

The measure of the success of the user admission algorithm is the degree to which the users miss any of their disk read deadlines. Recall from the discussion above regarding the extent-by-extent sequential disk access mode of operation, that a user enqueues a read request on a particular disk as soon as the extent on the previous disk starts being output. Since it takes one service period for that extent to be completely streamed out, the user's new read request has just one service period before its deadline will be missed. The amount of time into this one service period before the deadline period will be missed by a new user is based on a measure of the density of the local usage of the disk. If a user (e.g., user "M") is isolated from other users (e.g., users N, O, and P) as user M loops around the disk drive array 319, user M will complete the read requests very early in the deadline period. If, however, the users are clumped densely together, then some of them will complete their read requests farther into this deadline period. In fact, it may be that very rarely, successive accesses to a disk take sufficiently long that they conspire to force a user to miss a deadline with some tiny probability (like 1 in 1 million). Thus, as the server is loaded with more and more users, the probability of a user incurring a missed deadline will grow, as will the average new user latency (since the server will delay admitting new users when they request entry onto a densely populated disk).

Figure 8:
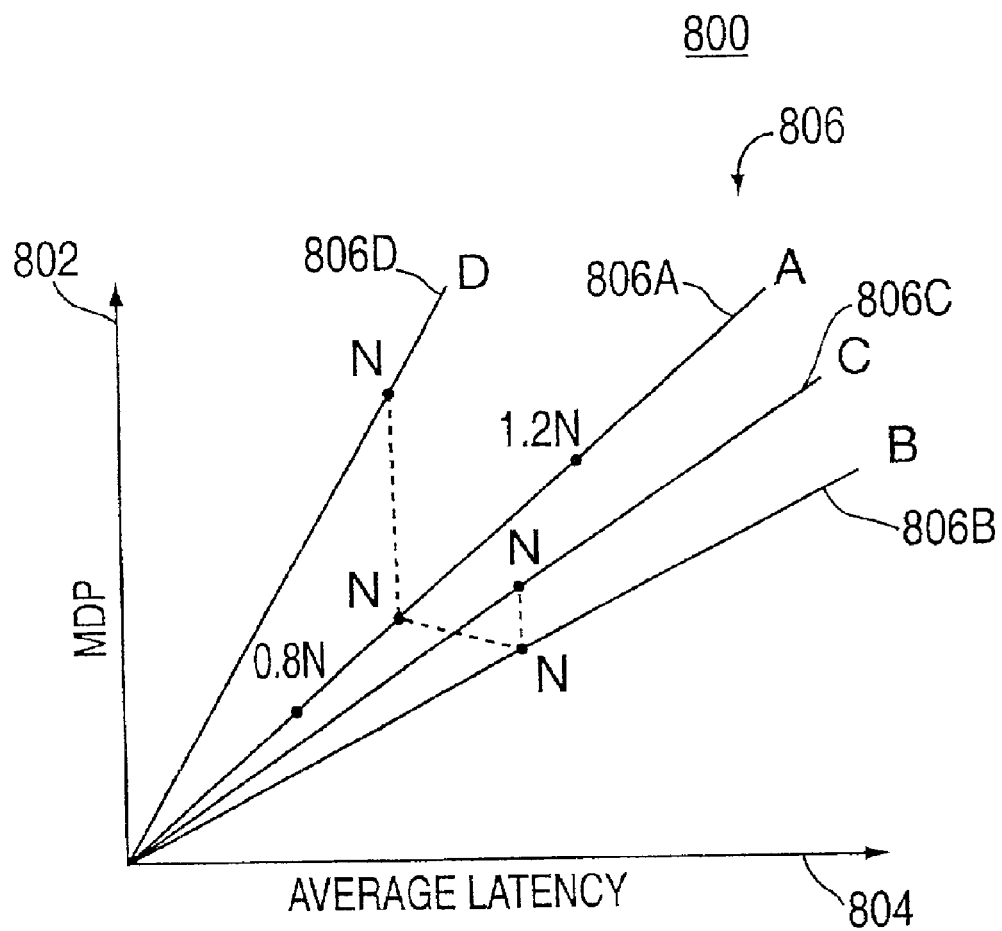
FIG. 8 depicts a graphical representation of the effects of user population on a server with respect to missed deadline probability (MDP) and average disk access latency.

FIG. 8 depicts a graphical representation 800 of the effects of user population on a server with respect to missed deadline probability (MDP) and average disk access latency. Specifically, the ordinate 802 of the graph is defined by the missed deadline probability (MDP) and the abscissa 804 is defined by the average latency of accessing an extent on a disk. The curves 806 in FIG. 8 represent expected disk access time probability distribution and show the manner in which the missed deadline probability (MDP) and the average latency grow as a server is populated with users. Curve A $806_A$, for example, shows MDP and average latency parametrically at three server populations (0.8N, N and 1.2N). As the user population grows, both MDP and average latency grow. It should be noted that the graph is meant only to depict this qualitatively, as opposed to quantitative real data. Suppose all users in that server 310 are streaming video out at the same bitrate, so all are reading the same sized extents 110. Moreover, the server population N is the maximum the server can hold and still guarantee an MDP below some maximum tolerable level and a reasonable latency. For example, the MDP may be 1 in 1 million at user population N, but 100 in 1 million at population 1.2N, making a population of 1.2N unacceptable since a missed deadline causes a glitch in the user's video stream.

Referring to FIG. 8, suppose a video server 310 is running at its normalized maximum user capacity (point N in curve A). Further suppose that at some instance all the disk reads (e.g., in a parity group) have their extent size increased by 33% (e.g., during a parity correction mode of operation), without the server's user admission algorithm accounting for the increase in extent size, in its "expected" access time distribution curves. As such, curve A $806_A$ would get shifted to the left as represented by curve D $806_D$, with each point (e.g., N) moving vertically on the diagram. The latency would not change (as that is dependent only the expected access time assumed by the admissions algorithm), but the probability of missed deadlines would substantially increase. Missed deadlines must, in fact, increase to some unacceptable level or else the server 310 was not tuned to run to at its maximum capacity at its original point (point N on curve A $806_A$). It may be, however, that although the new MDP (at point N in curve D $806_D$) is unacceptable for normal server operation, it may be tolerable during the 12 hours or so that the server 310 is operating in parity-correction mode and waiting for a disk replacement in order to complete the new disk rebuild.

Accordingly, for normal server operation, the stochastic nature of the disk access times is applied to a server system utilizing the RAID 3+5 disk regeneration algorithm described above in FIGS. 4–6. If the new MDP of curve D $806_D$ is high and deemed unacceptable for this brief period, then the server's user admission algorithm may be readjusted to allow an acceptable level to be found. In particular, the expected disk access time probability distribution curves 806 can be replaced with curves that predict larger access times. Accordingly, the users will be spread out more than what is required for their normal extent sizes, but will still be able to withstand the larger extent size reads during the parity correction mode using the RAID 3+5 disk regeneration algorithm without causing an unacceptable MDP. Keeping all disk reads to the normal smaller extent size (the true data, no parity extent only), but trading the disk access time distribution curves used in the admission algorithm with curves shifted to larger access times, generates curve B $806_B$ from curve A $806_A$.

The baseline point N in curve A, which represents the ideal maximum user population on the server 310, shifts to a larger disk access latency, but a smaller missed deadline probability (MDP) as shown on curve B $806_B$. Increasing the expected access times, but not the actual access times, spreads out the user distribution, leading to less chance of a high-density conglomeration of users and their concomitant greater likelihood of missing a deadline. Curve B $806_B$ illustrates the server performance curve running in normal (non-parity-correction) mode. When the server 310 is transitioned to parity-correction mode (i.e., the disk regeneration algorithm where larger extents are read), curve B $806_B$ is transitioned to curve C $806_C$ (again with each point moving only vertically, not changing new user latency, but increasing MDP). Therefore, if the MDP position (point N of curve C $806_C$) is tolerable for the 12 hours or so each year that the server 310 would be in its disk failure mode, and if the normal mode latency (point N of curve B $806_B$) is also acceptable, then an acceptable user disk access admissions algorithm for treating the longer disk reads during the parity correction mode of the RAID 3+5 data striping format may be utilized by a server system.

Although various embodiments that incorporate the teachings of the present invention have been shown and described in detail herein, those skilled in the art can readily devise many other varied embodiments that still incorporate these teachings.

What is claimed is:

1. A method for storing data on an array of disk drives, comprising:
   dividing at least a portion of storage capacity of each disk drive of said array into commonly sized extents for storing data and parity information;
   dividing each extent into a plurality of data segments;
   defining a parity group comprising at least three contiguous extents formed across said array of disk drives;
   storing said data in data segments associated with each parity group;
   generating first parity segments from said data segments associated with each parity group;
   storing said first parity segments;
   generating a second parity segment from said first parity segments; and
   storing said second parity segment.

2. The method of claim 1 wherein said storing said first parity segments step comprises appending one of said first parity segments after said data segments associated with an extent.

3. The method of claim 2 wherein each of n−1 extents in said parity group has one first parity segment appended thereon.

4. The method of claim 1 wherein said storing said second parity segment comprises appending said second parity segment to one of n extents in the parity group.

5. The method of claim 4 wherein said storing said second parity segment comprises appending said second parity segment after said data segments in the nth extent.

6. The method of claim 1 wherein said storing said data comprises storing information sequentially in each segment, extent by extent in said parity group.

7. The method of claim 6 wherein said generating said first parity segments comprises computing, for each first parity segment, parity information associated with a data segment formed continuously across each extent of said parity group.

8. The method of claim 1 wherein said generating said second parity segment comprises computing second parity information from each first parity segment in said parity group.

9. The method of claim 8 wherein said second parity segment comprises parity information associated with all of the data segments in said parity group.

10. A method for reconstructing lost data from a failed disk drive in an array of disk drives, said disk drive array formed into at least one parity group, wherein each parity group comprises data extents divided into data segments and parity segments that are generated from the data segments, said method comprising:
retrieving the parity segments from operative disk drives in a parity group containing the failed disk drive;
reconstructing parity information for the failed disk drive from the parity segments on the operative disk drives;
reconstructing data segments of the extent associated with the failed disk drive from the reconstructed parity information, the parity segments, and data segments on the operative disk drives.

11. The method of claim 10 wherein said retrieving step further comprises storing all of the data segments and the parity segments of the operative disk drives of the parity group in a buffer memory.

12. An apparatus for storing data comprising:
a plurality of disk drives formed into a parity group having m-data extents, wherein each disk drive comprises 1/m data extents further divided into p-data segments;
m−1 parity segments respectively coupled to m−1 data extents; each m−1 parity segment storing parity information corresponding to m-data segments sequentially positioned across the m-data extents located on different disk drives in the parity group; and
a second parity segment containing parity information for the m−1 parity segments and coupled to one of the m-data extents.

13. The apparatus of claim 12 wherein said parity group further comprises mp-data segments.

14. The apparatus of claim 12 wherein said m−1 parity segments are respectively appended at the end of said m−1 data extents.

15. The apparatus of claim 14 wherein said m−1 parity segments are sequentially appended to the m-data extents across the disk drives in the parity group.

16. The apparatus of claim 12 wherein said second parity segment is appended at the end of one of said m data extents of said parity group.

17. The apparatus of claim 16 wherein said second parity segment is appended to the $m^{th}$ data extent of said parity group.

18. An apparatus for storing data on an array of disk drives, comprising:
means for defining at least one parity group from said array of disk drives;
means for dividing extents of data from said at least one parity group into data segments;
means for generating parity segments from said data segments in said parity group;
means for generating a second parity segment from said parity segments, wherein said parity segments from said data segments and said second parity segment are attached to different data extents in the parity group.

19. The apparatus of claim 18 wherein the means for defining at least one parity group further comprises apportioning said array of disk drives into equally sized parity groups each having an equal number of disk drives.

20. The apparatus of claim 18 wherein the means for dividing extents of data further comprises defining one extent per disk drive in the parity group.

21. The apparatus of claim 19 wherein the data segments are apportioned equally in each extant of the at least one parity group.

22. The apparatus of claim 18 wherein said parity segments and said second parity segment are attached at the end of each extent.

23. A method for recovering data from a failed disk drive in a disk array comprising a plurality of disk drives, said plurality of disk drive each having a plurality of extents apportioned equally into a plurality of parity groups, said method comprising:
striping data from at least one file sequentially across the plurality of extents of the plurality of parity groups, said striping data comprising dividing each extent in each parity group into a plurality of data segments, storing data information in the plurality of data segments, forming a plurality of parity segments from the data segments in the parity group, and appending one parity segment to the end of each extent, wherein parity segments in the parity group respectively store parity information corresponding to the parity group in which the parity segments reside;
identifying a failed parity group containing an extent associated with the failed disk drive;
outputting, in realtime to users in a normal disk access mode, said data from parity groups without the failed disk drive;
reconstructing, in a parity correction mode of operation, said data from the at least one failed parity group; and
outputting, in realtime to the users in the failed parity group, said reconstructed data.

24. The method of claim 23 wherein the parity segments in the parity group store parity information for data segments in the parity group, as read sequentially across each extent, data segment by data segment.

25. The method of claim 24 wherein one of the parity segments in the parity group is a pure parity segment, which only contains parity information for other parity segments in the parity group.

26. The method of claim 25 wherein the pure parity segment in the parity group is positioned at the end of the last extent in the parity group.

27. The method of claim 26 wherein user access to the at least one file comprises accessing each extent sequentially, extent by extent across the plurality of disks in the disk array.

28. The method of claim 27 further comprising the step of accessing only the data segments of each extent in the parity group during the normal disk access mode.

29. The method of claim 28 further comprising the step of accessing only the parity segments in the parity group during the parity correction mode.

30. The method of claim 29 wherein the identifying step further comprises:
monitoring performance of the plurality of disks drives in the disk array;
comparing performance of each disk drive to a minimum threshold;
declaring a disk drive performing below said minimum threshold as being the failed disk; and
stopping access to the failed disk drive.

31. The method of claim 30 wherein, in an instance where the failed disk has been identified, the method further comprises transitioning the users accessing the failed parity group in the normal disk access mode to the parity correction mode.

32. The method of claim 31 wherein the parity correction mode comprises the step of implementing a disk regeneration algorithm to recover extent data on the failed disk drive from extent data on operable disks in the parity group.

33. The method of claim 30 wherein the disk regeneration algorithm comprises the steps of:
retrieving the data segments on the operable disk drives within the failed parity group;
regenerating failed data segments from the data segments on the operable disk drives and the parity segments in the parity group; and
buffering the regenerated extent data and the extent data from the operable disk drives in the parity group in a buffer memory.

34. The method of claim 33 wherein the user accesses the buffer memory containing the extent data from the parity group during the parity correction mode.

35. The method of claim 34 wherein the user is transitioned back to the normal disk access mode for accessing extent data in the parity groups without the failed disk drive.

36. The method of claim 35 wherein during the normal disk access mode the user sequentially accesses the extent data in the disk drives of the parity groups without the failed disk drive.

37. The method of claim 36 further comprising admitting new users access to the plurality of disk drives in the disk array coupled to the server according to a disk access admission algorithm having stochastic parameters, which include accounting for accessing the parity segments in the failed parity group during the parity correction mode.

38. The method of claim 37 wherein accounting for accessing the parity segments in the failed parity group further comprises setting expected disk access times greater than actual disk access times.

* * * * *

UNITED STATES PATENT AND TRADEMARK OFFICE
CERTIFICATE OF CORRECTION

PATENT NO. : 6,871,263 B2
DATED : March 22, 2005
INVENTOR(S) : Robert G. Dandrea It is certified that error appears in the above-identified patent and that said Letters Patent is hereby corrected as shown below:

Column 1,
Line 48, "require" should be -- required --.

Column 12,
Line 30, "servers" should be -- servers' --.

Column 14,
Line 66, "continuously" should be -- contiguously --.

Column 16,
Line 7, "extant" should be -- extent --.

Column 17,
Line 8, "30" should be -- 32 --.

Signed and Sealed this

Second Day of August, 2005

JON W. DUDAS
*Director of the United States Patent and Trademark Office*